US009567216B2

(12) United States Patent
McIlwaine et al.

(10) Patent No.: US 9,567,216 B2
(45) Date of Patent: Feb. 14, 2017

(54) REDUCING AGENTS FOR PRODUCING CHLORINE DIOXIDE

(71) Applicant: CHEMTREAT, INC., Glen Allen, VA (US)

(72) Inventors: Douglas McIlwaine, Ashland, VA (US); John Richardson, Hanover, VA (US)

(73) Assignee: CHEMTREAT, INC., Glen Allen, VA (US)

(*) Notice: Subject to any disclaimer, the term of this patent is extended or adjusted under 35 U.S.C. 154(b) by 4 days.

(21) Appl. No.: 14/620,942

(22) Filed: Feb. 12, 2015

(65) Prior Publication Data
US 2015/0225235 A1 Aug. 13, 2015

Related U.S. Application Data

(60) Provisional application No. 61/939,259, filed on Feb. 12, 2014.

(51) Int. Cl.
C01B 11/02 (2006.01)
C02F 1/76 (2006.01)
C02F 103/28 (2006.01)
C02F 101/34 (2006.01)

(52) U.S. Cl.
CPC .............. C01B 11/023 (2013.01); C02F 1/76 (2013.01); C02F 2101/345 (2013.01); C02F 2103/28 (2013.01); C02F 2303/04 (2013.01)

(58) Field of Classification Search
CPC ..... C01B 11/023; C02F 1/76; C02F 2101/345; C02F 2103/28; C02F 2303/04
See application file for complete search history.

(56) References Cited

U.S. PATENT DOCUMENTS

| 4,081,520 | A | 3/1978 | Swindells et al. |
| 4,473,540 | A | 9/1984 | Fredette |
| 5,091,167 | A | 2/1992 | Engstrom et al. |
| 5,116,595 | A | 5/1992 | Scribner et al. |
| 5,366,714 | A | 11/1994 | Bigauskas |
| 5,380,517 | A | 1/1995 | Sokol |
| 5,565,182 | A | 10/1996 | Sokol |
| 5,674,466 | A | 10/1997 | Dahl et al. |
| 5,770,171 | A | 6/1998 | Sundblad et al. |
| 5,895,638 | A | 4/1999 | Tenney |
| 6,576,213 | B1 | 6/2003 | Falgen et al. |
| 6,790,427 | B2 | 9/2004 | Charles et al. |
| 7,070,710 | B1 | 7/2006 | Tenney et al. |

(Continued)

FOREIGN PATENT DOCUMENTS

EP 1198411 A1 4/2002
WO 00/76916 A1 12/2000

OTHER PUBLICATIONS

Yin et al., "Mechanism of the Cl02 Generation from the H2O2-HClO3 Reaction", The Canadian Journal of Chemical Engineering, vol. 78, Aug. 2000, pp. 827-833.

(Continued)

Primary Examiner — Lucas Stelling
(74) Attorney, Agent, or Firm — Oliff PLC

(57) ABSTRACT

Methods of producing chlorine dioxide including providing an acid, a chlorate salt and an organic water treatment additive that can form a reducing agent in situ, mixing the acid, the chlorate salt and the organic water treatment additive, and reacting the mixture.

22 Claims, 3 Drawing Sheets

(56) References Cited

U.S. PATENT DOCUMENTS

2003/0007899 A1* 1/2003 Charles ............... C01B 11/026
 422/129
2003/0200997 A1* 10/2003 Gill ........................ C02F 1/50
 134/22.12

OTHER PUBLICATIONS

Rapson, "A New Process for the Manufacture of Chlorine Dioxide", TAPPI, vol. 41, No. 4, Apr. 1958, pp. 181-185.

Partridge et al., "Mill Operation of the R-2 Process for Chlorine Dioxide Generation", TAPPI, vol. 44, No. 10, Oct. 1961, pp. 698-702.

Barr et al., "The Development of an Integrated Chlorine Dioxide Process to Produce Chlorine Dioxide Solution with Low Chlorine Content", Appita Journal, vol. 59, No. 6, Nov. 2006, pp. 442-445.

Fredette, "Chapter 2: Bleaching Chemicals: Chlorine Dioxide", Pulp Bleaching Principles and Practice, Section II: Raw Materials, 1996, pp. 59-69.

Ni et al., "Mechanism of the Methanol-Based ClO2 Generation Process", Journal of Pulp and Paper Science, vol. 23, No. 7, Jul. 1997, pp. J346-J352.

Brown et al., "Ion-Exchange Technologies for the Minimum Effluent Kraft Mill", CPPA Technical Section Symposium on System Closure II, Jan. 26-30, 1998, pp. 1-7.

Hellman et al., "Hydroxymethyl-phosphine", Angew. Chem., vol. 72, No. 6, 1960, p. 211.

Kirby et al., "The Organic Chemistry of Phosphorus", 1967, pp. 152-153.

Trippett, "The Rearrangement of 1-Hydroxyalkylphoshines to Alkyl-phosphine Oxides", J. Chem. Soc., Jan. 1, 1961, pp. 2813-2816.

Gagnon et al., "Comparative Analysis of Chlorine Dioxide, Free Chlorine and Chloramines on Bacterial Water Quality in Model Distribution Systems", Journal of Environmental Engineering, Nov. 2004, pp. 1269-1279.

* cited by examiner

REDUCING AGENTS FOR PRODUCING CHLORINE DIOXIDE

CROSS-REFERENCE TO RELATED APPLICATION

This application claims the benefit of U.S. Provisional Application No. 61/939,259, filed Feb. 12, 2014. The disclosure of the prior application is hereby incorporated by reference herein in its entirety.

TECHNICAL FIELD

This application is directed to novel methods for chlorine dioxide generation.

BACKGROUND

Chlorine dioxide ($ClO_2$) is an oxidizing agent used to sterilize drinking water and as a bactericide in general water treatment. Major uses of chlorine dioxide today include disinfection, control of taste and odor, control of iron and manganese, and control of hydrogen sulfide and phenolic compounds. The metabolism of microorganisms and consequently their ability to survive and propagate are influenced by the oxidation reduction potential (ORP) of the medium in which they live. Chlorine dioxide is a neutral compound of chlorine in the +IV oxidation state. It disinfects by oxidation; however, it does not chlorinate. It is a relatively small, volatile, and highly energetic molecule, and a free radical even while in dilute aqueous solutions. At high concentrations, it reacts violently with reducing agents. However, it is stable in dilute solution in a closed container in the absence of light. Chlorine dioxide functions as a highly selective oxidant due to its unique, one-electron transfer mechanism where it is reduced to chlorite. The pKa for the chlorite ion, chlorous acid equilibrium, is extremely low at pH 1.8. The oxidation reduction of some key reactions are:

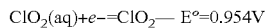
$ClO_2(aq)+e^-=ClO_2^-$ $E°=0.954V$

Other important half reactions are:

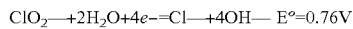
$ClO_2^-+2H_2O+4e^-=Cl^-+4OH^-$ $E°=0.76V$

$ClO_3^-+H_2O+2e^-=ClO_2^-+2OH^-$ $E°=0.33V$

$ClO_3^-+2H^++e^-=ClO_2+H_2O$ $E°=1.152V$

One of the known methods for producing chlorine dioxide uses a mixture of sodium chlorate, an acid and hydrogen peroxide with the hydrogen peroxide functioning as a reducing agent in the reaction. The use of hydrogen peroxide in the chlorine dioxide generation process, however, releases oxygen gas as a by-product of the reaction. The generation and release of oxygen gas presents an engineering problem for the design, construction and operation of chlorine dioxide generators utilizing this chemistry. In particular, the generator must be configured for safely accommodating the generation and release of oxygen without resulting in excessive pressures or accumulations increases the risk of equipment failures and/or explosions.

Hydrogen peroxide use in chlorine dioxide generation chemistries has been detailed in a number of patents and other publications including, for example: Yin, G., "Mechanism of the $ClO_2$ Generation from the $H_2O_2$—$HClO_3$ Reaction," *Can. J. Chem. Eng.*, 78(2000) 827-33; U.S. Pat. Nos. 5,091,167; 5,366,714; 5,380,517; 5,565,182; 5,895,638; 6,576,213; 6,790,427 and 7,070,710 and European Patent No. 1198411, the contents of which are incorporated herein, in their entirety, by reference.

Another known method for producing chlorine dioxide uses a mixture of sodium chlorate, an acid and methanol with the methanol functioning as a reducing agent in the reaction. However, this method can be costly and inefficient in terms of chloride dioxide production and involves the handling of methanol which is flammable. Disclosures relating to methanol use in chlorine dioxide generation chemistries have been detailed in a number of patents and other publications including, for example, Fredette, M. C., "Bleaching Chemicals: Chlorine Dioxide," Pulp Bleaching—Principles and Practice, Chap. 2, TAPPI Press (1996); Ni, Y., et al., "Mechanism of the Methanol-Based $ClO_2$ Generation Process," *J. Pulp Paper Sci.* 23, J346-52 (1997); Ni, Y., et al., "Mechanism of the Methanol-Based $ClO_2$ Generation Process," 1996 International Pulp Bleaching Conference; Brown, C. J., et al., "Ion-exchange technologies for the minimum effluent kraft mill," CPPA Technical Section Symposium on System Closure II, Montreal, Jan. 26-30, 1998, and U.S. Pat. Nos. 4,081,520; 4,473,540; 5,116,595; 5,674,466 and 5,770,171, the contents of which are incorporated herein, in their entirety, by reference.

These and other issues are addressed by the present disclosure. It is an object of this disclosure to provide novel systems and methods for chlorine dioxide production using an unexpectedly beneficial reducing agent in the form of a phosphine. Advantages of the present disclosure over existing methods for chlorine dioxide production include not producing oxygen as a byproduct, no flammable components are required, and efficient chlorine dioxide production is achieved.

SUMMARY

In a first embodiment, there is provided a method of producing chlorine dioxide. The method may include providing an acid, a chlorate salt and an organic water treatment additive that can form a phosphine compound; then mixing the acid, the chlorate salt and the organic water treatment additive; and reacting the mixture at a temperature greater than 35° C. C to produce chlorine dioxide.

In another embodiment, there is provided a method of producing chlorine dioxide. The method may include providing an acid and a stable composition including a chlorate salt and a cationic organic water treatment additive; heating the acidic solvent; and then mixing the composition with the acid to produce a disinfectant including the chlorine dioxide.

In another embodiment, there is provided a method of treating an industrial system with a phosphine. The method may include providing an acid, a chlorate salt and an organic water treatment additive that can form the reducing agent; then mixing the acid, the chlorate salt and the organic water treatment additive; and reacting the mixture at a temperature greater than 35° C.

DETAILED DESCRIPTION

Figure 1:
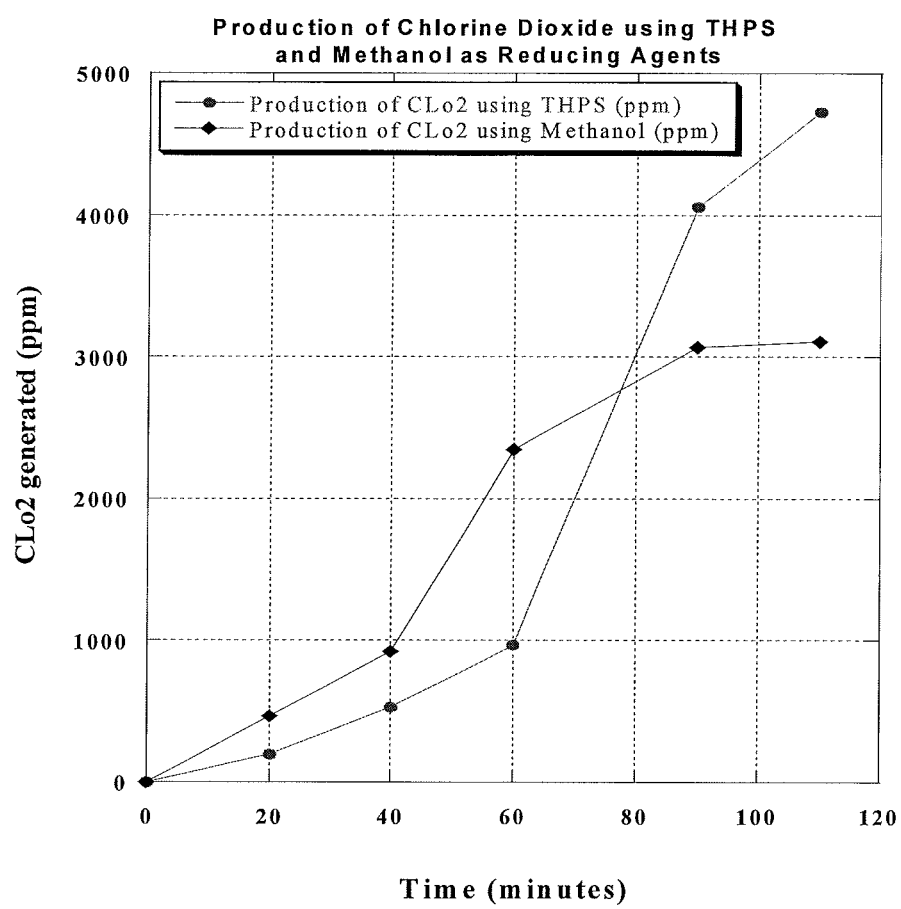
FIG. 1 is a graph comparing $ClO_2$ production of a disclosed embodiment to that of a comparative example.

Disclosed methods include the novel application of phosphines in chlorine dioxide generation. While phosphines are known to be very strong reducing agents in organic chemistry, the use of phosphines as a reducing agent in the generation of chlorine dioxide and the associated advantages with such a reaction are unexpected and surprising. The general chemistry of phosphines has been detailed in a number of patents and other publications including, for example, Hellmann, H., et al., "Hydroxymethylphosphines," *Angew. Chem.* 72, 211 (1960); Kirby, A. J., et al., The Organic Chemistry of Phosphorus, Elsevier, pp. 152-53 (1967); Trippett, S., "The Rearrangement of 1-Hydroxyalkylphosphines to Alkylphosphine Oxides." *J. Chem. Soc.* 2813 (1961) and Advanced Organic Chemistry; Reactions, Mechanisms, and Structure; 4th Ed., John Wiley & Sons (1992) and references cited therein, the contents of which are incorporated herein, in their entirety, by reference.

In embodiments, the phosphine may be tris(hydroxymethyl)phosphine (CAS No. 2767-80-8) (illustrated below):

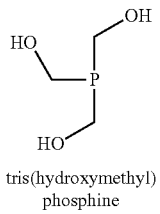

tris(hydroxymethyl) phosphine

In aqueous solution, tris(hydroxymethyl)phosphine can act as a reducing agent. The phosphine may be derived from one or more organic water treatment additives such as, for example, organic phosphonium compounds, as substitutes for hydrogen peroxide or methanol as the reducing agents in the production of chlorine dioxide from chlorate. In preferred embodiments, the additive may be a cationic additive such as tetrakis(hydroxymethyl)phosphonium chloride (THPC) (CAS No. 124-64-1) (e.g., 80% active ingredient by weight in water) and/or tetrakis(hydroxymethyl)phosphonium sulfate (THPS) (CAS No. 55566-30-8) (e.g., 75% active ingredient by weight in water).

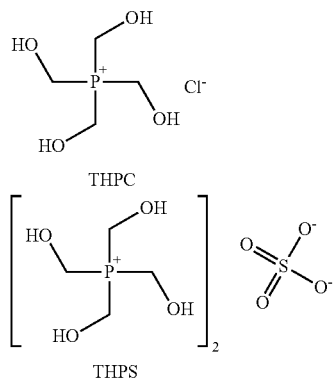

THPC is widely used in industrial applications as a flame retardant while THPS is widely used in a variety of industrial applications as a biocide, hydrogen sulfide scavenger and iron sulfide scavenger. The use of THPS as an industrial water treatment biocide has been limited because it is easily oxidized and is not, therefore, considered compatible with commonly used oxidizing agents including, for example, hypochlorous acid, hypobromous acid and hydrogen peroxide found in industrial water systems. Both THPC and THPS are capable of forming tris(hydroxymethyl)phosphine.

In embodiments, the reducing agent, the phosphine, may be applied in a water system in combination with a salt such as, for example, sodium chlorate, and a solvent such as, for example, sulfuric acid. It is believed that the chemistry associated with the production of chlorine dioxide from a THPC or THPS precursor generally follows two steps. The first step is the creation of the reducing agent, such as the phosphine, from THPC or THPS. The second step is the creation of the chlorine dioxide from the reaction of the phosphine, the chlorate salt and the solvent. Specifically, it is believed that the chlorate salt is reduced by the phosphine to produce chlorine dioxide.

In the first step, it is believed that exposing THPC or THPS to a base such as, for example, water or sodium hydroxide forms tris(hydroxymethyl)phosphine. In these reactions, THPC and THPS give up a chloride or sulfate ion, respectively, to the process resulting in the production of the phosphine, water, formaldehyde a salt and potentially other byproducts. For example, the treatment of THPC and THPS with aqueous sodium hydroxide is illustrated in reactions (1) and (2) below:

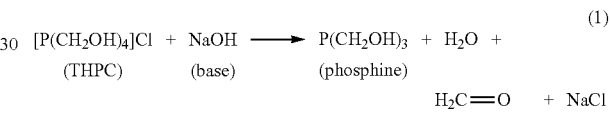

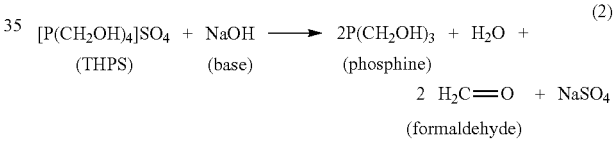

In the second step, it is believed that mixing one mole of the phosphine with sodium chlorate and heated sulfuric acid consumes a chloride ion from an unstable chlorine atom in the +5 oxidation state in chlorate. In this step, chlorine dioxide is produced and oxygen is not.

By way of comparison, the chemistry associated with chlorine dioxide generation according to a conventional method using methanol as a reducing agent is reflected in comparative reactions (3a) to (5a) below:

$$HClO_3 + HCl \rightarrow HClO_2 + HClO \quad (3a)$$

$$HClO_3 + HClO_2 \rightarrow 2ClO_2 + H_2O \quad (4a)$$

$$HClO + CH_3OH \rightarrow HCl + HCHO + H_2O \quad (5a)$$

As shown, reaction (3a) consumes the chloride ion while reaction (5a) regenerates it so that it can be important to control the relative reaction rates of reactions (3a) and (5a). In particular, if the reaction (3a) is producing HClO much faster than it is being consumed in reaction (5a), then a portion of the HClO can be lost to the competing reaction (6a), producing chlorine gas and raising the associated concerns.

$$HClO + HCl \rightarrow Cl_2 + H_2O \quad (6a)$$

In disclosed embodiments, the chlorate salt and the organic water treatment additive may added separately or provided together in a prepared stable composition (stable at 1 ATM). The chlorate salt and the organic water treatment additive may be provided in the solution or together in the stable composition in a ratio in the range of 1:5 to 5:1 by weight, or 1:1 to 1:5, or more preferably 1:1 to 1:4 by weight. On a molar basis, in the reaction mixture or the stable composition, the chlorate salt and additive can be present in a ratio of from 1:5 to 5:1 and is preferably in less than substantially equal molar amounts. For example, in embodiments, the ratios may be 1 mole of chlorate to 0.25 to 1 mole of THPS, and 1 mole of chlorate to 0.5 to 1 mole of THPC, since each mole of THPS can contribute 4 moles of electrons, and each mole of THPC can contribute 2 moles of electrons.

In disclosed embodiments, the composition including the chlorate salt and organic water treatment additive may be added to the acid solution in a ratio of 1-20 grams per 100 ml, or 1-10 grams per 100 ml, or more preferably, 1-6 grams per 100 ml. The acid may be provided in a concentration of 3 N or greater, or 5 N to 12 N, or more preferably, 5 N-9 N.

The acid may be heated prior to mixing with the stable composition including the chlorate salt and the cationic organic water treatment additive. For example, the acid may be heated to about 35° C. or higher, or more preferably, 50° C. to 70° C.

Figure 2:
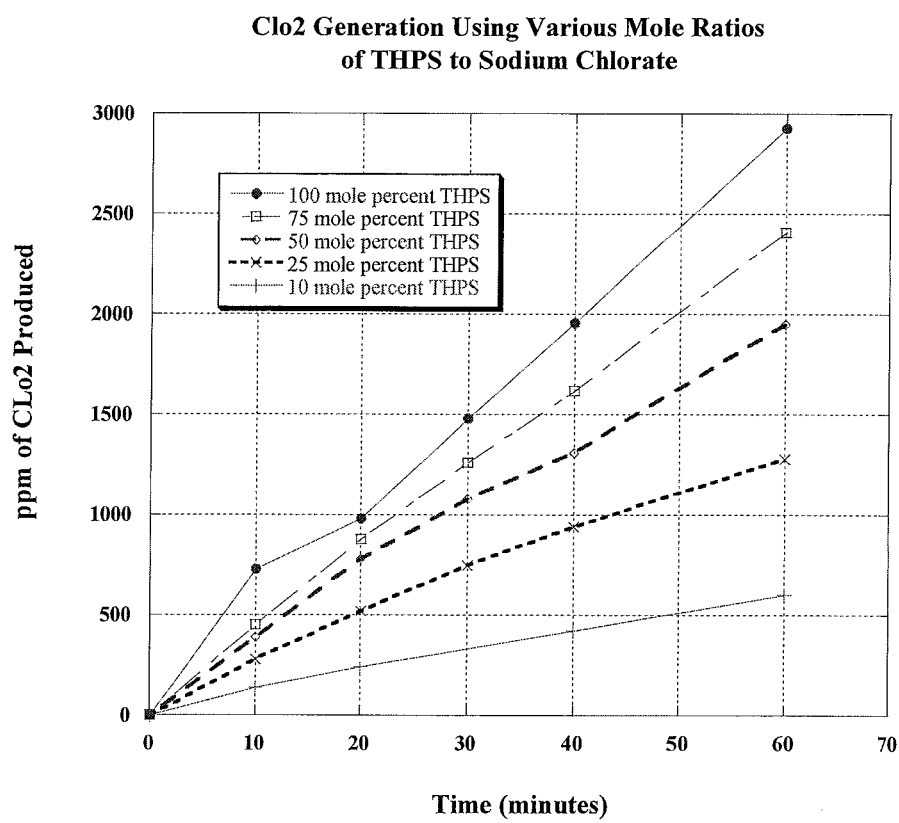
FIG. 2 is a graph illustrating production concentrations of $ClO_2$ based on THPS amounts of disclosed embodiments.
Figure 3:
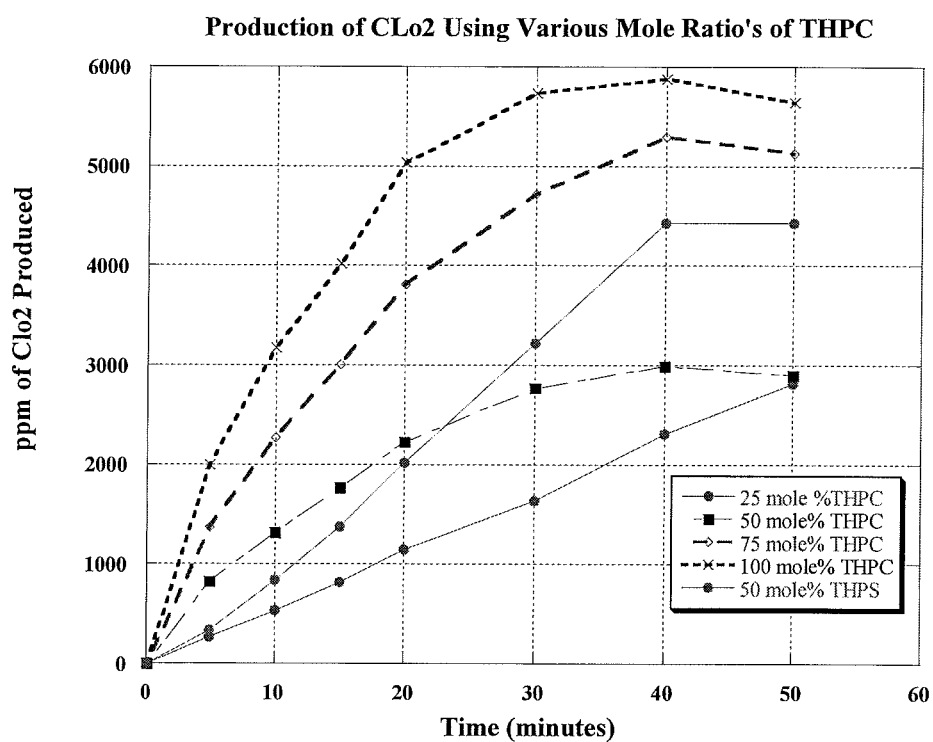
FIG. 3 is a graph illustrating production concentrations of $ClO_2$ based on THPC and THPS amounts of disclosed embodiments.

The reaction produces a reaction product with an amount of $ClO_2$ ranging from 1 to 20,000 ppm, 1,000 to 5,000 ppm, or 3,000 to 10,000 ppm, or more preferably, 3,000 to 6,000 ppm depending on the ratios and amounts of reactants. As shown in FIGS. 1-3, the $ClO_2$ concentration produced can vary with reaction time.

In embodiments, the chlorine dioxide may be extracted or used in solution as a disinfectant and introduced into a water stream at an appropriate dosage and concentration. The concentration of the chlorine dioxide in the disinfectant may range from 25% to 95% by weight, or 40% to 75%, or more preferably, 50% to 75% by weight. The dosage may be introduced into the water stream over a first time period and have a first concentration during the first time period and a second concentration during a second time period. For example, the first concentration may be in the range of 1 to 300 ppm, or 1 to 100 ppm, or more preferably, 1 to 50 ppm in the water system. The second time period and concentration may vary depending on systemic circumstances including, but not limited to, water purity.

In water systems, the $ClO_2$ can be reacted in a generator, such as a loop-based generator, a French-type loop-based generator, a batch generator, an intermittent batch generator, a continuous generator, an acid-enhanced generator, a vapor-phase generator, a recycled loop generator, or a solid chlorite-type generator. Once reacted to the desired concentration, the disinfectant can be introduced into a water system or other process.

In embodiments, the water system may be a municipal drinking water system or an industrial recirculating cooling water system such as those used in pulp and paper plants, including components thereof, such as a cooling tower. The chlorine dioxide may be used as a disinfectant, a pre-oxidant, as well as for the control of odor, taste, iron, manganese, hydrogen sulfide and phenolic compounds.

Example 1

In this example, a 9N sulfuric acid solution (100 ml) was heated to 50° C. in a 250 ml Erlenmeyer flask. A mixture of equimolar amounts of THPS (0.012 moles, 4.5 grams) and sodium chlorate (0.012 moles, 1.27 grams) was then added to the heated sulfuric acid solution with stirring and the flask was capped. The reaction solution immediately began turning from clear to yellow reflecting the rapid and substantial production of chlorine dioxide within the reaction mixture.

For comparison, in a comparative example, chlorine dioxide was produced using a conventional combination of sodium chlorate (1.27 grams, 0.012 moles) and methanol (1.38 grams, 0.043 moles) as the reducing agent was also performed at the same time, in the same manner.

Samples of the reaction mixtures were withdrawn and analyzed for chlorine dioxide concentration using a UV-Vis Spectrophotometer, specifically a Hach DR5000. The production of chlorine dioxide in each flask was monitored for 110 minutes, and the amount of chlorine dioxide detected in the test solutions is shown in the graph illustrated in FIG. 1.

These results demonstrate that THPS is a viable and unexpectedly effective reducing agent for the production of chlorine dioxide when using sodium chlorate. Further, the efficiency of the chlorine dioxide generation reaction was improved by using THPS as the reducing agent rather than methanol.

Example 2

In this example, the amount of THPS used was varied to determine the effect of increasing THPS concentration relative to that of the chlorate on the amount of chlorine dioxide produced. Accordingly, while keeping the amount of sodium chlorate used constant (1.27 grams, 0.012 moles), the amount of THPS added to the sample mixture was varied to provide reaction solutions containing 10, 25, 50, 75 and 100 mole percent of the THPS relative to the sodium chlorate. These reactions were again performed in 100 ml of 9N sulfuric acid at a temperature of 52° C. The resulting generation of chlorine dioxide was monitored over 1 hour using the Hach DR5000. The results obtained are illustrated in FIG. 2.

These results demonstrate that both the rate and the amount of chlorine dioxide produced may be dependent upon the amount of THPS used relative to the sodium chlorate.

Example 3

In this example, chlorine dioxide production was analyzed using THPC compared to THPS as the reducing agent. As in the previous experiments, 100 ml of 9N sulfuric acid was heated to 66° C. and a mixture of sodium chlorate (1.27 grams, 0.012 moles) and THPC was then added. The amount of THPC was varied relative to the amount of sodium chlorate used with samples prepared corresponding to 25 mole percent (0.57 grams, 0.003 moles), 50 mole percent (1.15 grams, 0.006 moles), 75 mole percent (1.72 grams, 0.009 moles) and 100 mole percent (2.29 grams, 0.012 moles). For comparison, a control sample using THPS at 50 mole percent (2.98 grams, 0.006 moles) was also prepared and evaluated. The results obtained from this set of experiments are illustrated in FIG. 3.

These results demonstrate that (1) the production of $ClO_2$ using THPC is relatively fast. As shown in FIG. 3, after a reaction period of only 5 minutes the sample with 100 mole % of THPC had obtained a $ClO_2$ level of 2000 ppm. As with the THPS results reported above, higher concentrations of $ClO_2$ were obtained with higher mole percent concentrations of THPC. This illustrated dependence on the concentration of the phosphonium species and temperature provides a means for controlling the rate at which $ClO_2$ is produced in a generator utilizing this chemistry so that the $ClO_2$ concentration and/or volume can easily be tailored for a wide range of applications.

These results show that the chlorine dioxide generation reaction using THPC as the reducing agent is faster than the corresponding reaction using THPS as the reducing agent when used at the same mole percent. After 10 minutes, the reaction mixture using THPC as the reducing agent had generated 1320 ppm of $ClO_2$, whereas the reaction mixture using an equal molar percentage of THPS had generated only 840 ppm of $ClO_2$ over the same time period.

A comparison of the results from these experiments also demonstrates that the reaction is fairly temperature dependent, with the reactions at higher temperatures tending to produce chlorine dioxide at higher rates and concentrations. Some of the variations in the measured chlorine dioxide concentrations between the experiments may be the result of various mechanisms including, for example, losses to the atmosphere from the unsealed vessels, competing reactions, exhaustion of the reducing agent(s) and/or high temperature degradation.

It will be appreciated that the above-disclosed features and functions, or alternatives thereof, may be desirably combined into different systems or methods. Also, various alternatives, modifications, variations or improvements may be subsequently made by those skilled in the art, and are also intended to be encompassed by the following claims. As such, various changes may be made without departing from the spirit and scope of this disclosure as defined in the claims.

What is claimed is:

1. A method of producing chlorine dioxide, the method comprising:
   providing an acid solution, a chlorate salt and an organic water treatment additive that can form a phosphine compound, the phosphine compound being effective to reduce the chlorate salt;
   then mixing the chlorate salt and the organic water treatment additive with the acid solution at a ratio of 1-20 grams combined chlorate salt and organic water treatment additive per 100 ml of the acid solution, and the chlorate salt and the organic water treatment additive being respectively present in the mixture at a ratio in the range of 1:1 to 4:1 by molar basis; and
   reacting the mixture at a temperature greater than 35° C. so that the phosphine compound reduces the chlorate salt and thereby produces chlorine dioxide at a concentration in the range of 1 to 20,000 ppm.

2. The method of producing chlorine dioxide according to claim 1, wherein the chlorate salt and the organic water treatment additive are provided together in a stable composition before the mixing step.

3. The method of producing chlorine dioxide according to claim 1, wherein the acid is heated before the mixing step.

4. The method of producing chlorine dioxide according to claim 1, wherein the additive is a cationic phosphonium compound.

5. The method of producing chlorine dioxide according to claim 4, wherein the phosphonium compound produces the phosphine when mixed with the acid or water.

6. The method of producing chlorine dioxide according to claim 4, wherein the phosphonium compound is at least one of tetrakis(hydroxymethyl)phosphonium chloride and tetrakis(hydroxymethyl)phosphonium sulfate.

7. The method of producing chlorine dioxide according to claim 1, wherein the chlorate salt and the organic water treatment additive are provided in the mixture in a ratio in the range of 1:1 to 1:5 by weight.

8. The method of producing chlorine dioxide according to claim 1, wherein the chlorate salt and additive are provided in the mixture in a ratio in the range of 1:3 to 1:4 by weight.

9. The method of producing chlorine dioxide according to claim 1, wherein the chlorate salt is sodium chlorate.

10. The method of producing chlorine dioxide according to claim 1, wherein the acid is provided in a concentration of from 5 N to 12 N.

11. The method of producing chlorine dioxide according to claim 10, wherein the acid is provided in a concentration of from 5 N to 9 N.

12. The method of producing chlorine dioxide according to claim 1, wherein the acid is sulfuric acid.

13. The method of producing chlorine dioxide according to claim 3, wherein the heating step comprises heating the acid to greater than 35° C.

14. The method of producing chlorine dioxide according to claim 1, wherein the reacting step produces a disinfectant composition that includes the chlorine dioxide.

15. The method of producing chlorine dioxide according to claim 1, wherein the phosphine compound reduces the chlorate salt and thereby produces chlorine dioxide at a concentration in the range of 1,000 ppm to 10,000 ppm.

16. The method of producing chlorine dioxide according to claim 15, wherein the phosphine compound reduces the chlorate salt and thereby produces chlorine dioxide at a concentration in the range of 3,000 ppm to 10,000 ppm.

17. The method of producing chlorine dioxide according to claim 14, further comprising introducing into a water stream a dose of the disinfectant, the dose being introduced into the water stream over a first time period and the water stream having a first concentration of the disinfectant during the first time period.

18. The method of producing chlorine dioxide according to claim 17, wherein the water system is a water system of a municipal drinking water facility, a pulp plant or a paper plant.

19. The method of producing chlorine dioxide according to claim 1, wherein the chlorine dioxide is used as at least one of a disinfectant, a pre-oxidant, a hydrogen sulfide scavenger and a phenolic compound controller.

20. The method of producing chlorine dioxide according to claim 1, wherein the chlorate salt and the organic water treatment additive are mixed with the acid solution at a ratio of 1-10 grams combined chlorate salt and organic water treatment additive per 100 ml of the acid solution.

21. A method of producing chlorine dioxide, the method comprising:
   providing an acid solution and a stable composition including a chlorate salt and a cationic organic water treatment additive that can form a phosphine compound, the phosphine compound being effective to reduce the chlorate salt, and the chlorate salt and the cationic organic water treatment additive being respectively present in the stable composition at a ratio in the range of 1:1 to 4:1 by molar basis;
   heating the acid; and
   then mixing the composition with the acid solution at a ratio of 1-20 grams per 100 ml of the acid solution so that the phosphine compound reduces the chlorate salt to thereby produce a disinfectant including the chlorine dioxide at a concentration in the range of 1 to 20,000 ppm in the disinfectant.

22. The method of producing chlorine dioxide according to claim 20, wherein the chlorate salt and the organic water treatment additive are mixed with the acid solution at a ratio of 1-6 grams combined chlorate salt and organic water treatment additive per 100 ml of the acid solution.

* * * * *